US010754790B2

(12) United States Patent
Norman et al.

(10) Patent No.: US 10,754,790 B2
(45) Date of Patent: Aug. 25, 2020

(54) TRANSLATION OF VIRTUAL ADDRESSES TO PHYSICAL ADDRESSES USING TRANSLATION LOOKASIDE BUFFER INFORMATION

(71) Applicant: QUALCOMM Incorporated, San Diego, CA (US)

(72) Inventors: Jason Norman, Cary, NC (US); Piyush Patel, Cary, NC (US); Rakesh Anigundi, San Diego, CA (US); Sadayan Ghows Ghani Sadayan Ebramsah Mo Abdul, Morrisville, NC (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 15/964,061

(22) Filed: Apr. 26, 2018

(65) Prior Publication Data

US 2019/0332550 A1 Oct. 31, 2019

(51) Int. Cl.
*G06F 12/1027* (2016.01)

(52) U.S. Cl.
CPC .. *G06F 12/1027* (2013.01); *G06F 2212/1016* (2013.01); *G06F 2212/683* (2013.01)

(58) Field of Classification Search
CPC ........... G06F 12/1027; G06F 2212/683; G06F 2212/1016
See application file for complete search history.

(56) References Cited

U.S. PATENT DOCUMENTS

| | | | |
|---|---|---|---|
| 5,437,017 A | 7/1995 | Moore et al. | |
| 8,607,008 B1 | 12/2013 | Glasco et al. | |
| 9,405,700 B2 | 8/2016 | Wingard et al. | |
| 2014/0075151 A1* | 3/2014 | Cain, III | G06F 12/1027 711/207 |
| 2016/0077761 A1 | 3/2016 | Stabrawa et al. | |
| 2016/0140042 A1* | 5/2016 | Mukherjee | G06F 12/0891 711/123 |
| 2016/0140043 A1 | 5/2016 | Mukherjee et al. | |
| 2016/0323407 A1* | 11/2016 | de los Reyes Darias | H04L 67/2842 |

FOREIGN PATENT DOCUMENTS

WO 9908191 A1 2/1999

OTHER PUBLICATIONS

International Search Report and Written Opinion—PCT/US2019/029044—ISA/EPO—dated Sep. 2, 2019.

\* cited by examiner

*Primary Examiner* — Larry T Mackall (74) *Attorney, Agent, or Firm* — Muncy, Geissler, Olds & Lowe, P.C.

(57) ABSTRACT

A memory management unit (MMU) is disclosed. The MMU is configured to receive a translation request from a processing system, wherein the translation request specifies a virtual address to be translated, search a page table stored in a physical memory system for a page table entry that specifies the virtual address, receive a translation lookaside buffer invalidation (TLBI) signal from the processing system, wherein the TLBI signal specifies the virtual address, in response to receiving the TLBI signal specifying the virtual address, invalidate a translation lookaside buffer (TLB) entry in a TLB, wherein the invalidated TLB entry specifies the virtual address and restart the search of the page table for the page table entry that specifies the virtual address.

24 Claims, 7 Drawing Sheets

TRANSLATION OF VIRTUAL ADDRESSES TO PHYSICAL ADDRESSES USING TRANSLATION LOOKASIDE BUFFER INFORMATION

INTRODUCTION

Aspects of this disclosure relate generally to cache memory, and more particularly to translation of virtual addresses to physical addresses.

A device may comprise a processing system comprising one or more central processing units (CPUs), a virtual memory management unit (MMU), and a translation lookaside buffer (TLB). The processing system may communicate with a physical memory system, for example, Random Access Memory (RAM). In the physical memory system is at least one page table that maps each virtual address to a physical address associated with the physical memory system.

Using the map, the MMU may translate any virtual address into a physical address. A substantially complete map may be provided in the physical memory system, whereas the TLB may include a smaller subset of translations (typically corresponding to virtual addresses of high importance or frequent/recent use). The TLB is smaller than the physical memory system, and can therefore be searched more quickly.

The physical memory system has a limited capacity. Accordingly, it is often necessary to update the address maps in the TLB and the page table. When new data is requested after the capacity of the physical memory system has been reached, then older pages within the physical memory system must be overwritten with pages that include the requested new data. Any translations that point to the pages to be overwritten (whether in the TLB or the page table) must be invalidated.

Occasionally, a circumstance arises wherein a particular translation is invalidated in the TLB at the same time that a translation of the specified virtual address is in the process of being located in the page table. In accordance with a conventional approach, the virtual addresses are marked invalid and translations of the virtual addresses are completed. The processing system is then notified when the translations and invalidations are complete. The processing system may move on with particular processes only after the notification is received.

As noted above, searches of the page table may be time-consuming. Accordingly, in the circumstance described above, the processing system is required to spend time waiting for the notification. Accordingly, the processing system can not move on to other processes and the device operates more slowly. Accordingly, new techniques are needed for rapid translation and remapping of virtual addresses.

SUMMARY

The following summary is an overview provided solely to aid in the description of various aspects of the disclosure and is provided solely for illustration of the aspects and not limitation thereof.

In accordance with aspects of the disclosure, a memory management unit (MMU) is disclosed. The MMU may be configured to receive a translation request from a processing system, wherein the translation request specifies a virtual address to be translated, search a page table stored in a physical memory system for a page table entry that specifies the virtual address, receive a translation lookaside buffer invalidation (TLBI) signal from the processing system, wherein the TLBI signal specifies the virtual address, in response to receiving the TLBI signal specifying the virtual address, invalidate a translation lookaside buffer (TLB) entry in a TLB, wherein the invalidated TLB entry specifies the virtual address and restart the search of the page table for the page table entry that specifies the virtual address.

In accordance with other aspects of the disclosure, a method is disclosed. The method may comprise receiving, at a memory management unit (MMU), a translation request from a processing system, wherein the translation request specifies a virtual address to be translated, searching a page table stored in a physical memory system for a page table entry that specifies the virtual address, receiving a translation lookaside buffer invalidation (TLBI) signal from the processing system, wherein the TLBI signal specifies the virtual address, in response to receiving the TLBI signal specifying the virtual address, invalidating a translation lookaside buffer (TLB) entry in a TLB, wherein the invalidated TLB entry specifies the virtual address, and restarting the search of the page table for the page table entry that specifies the virtual address.

In accordance with other aspects of the disclosure, an apparatus is disclosed. The apparatus may comprise means for receiving, at a memory management unit (MMU), a translation request from a processing system, wherein the translation request specifies a virtual address to be translated, means for searching a page table stored in a physical memory system for a page table entry that specifies the virtual address, means for receiving a translation lookaside buffer invalidation (TLBI) signal from the processing system, wherein the TLBI signal specifies the virtual address, means for invalidating a translation lookaside buffer (TLB) entry in a TLB, wherein the invalidated TLB entry specifies the virtual address in response to receiving the TLBI signal specifying the virtual address, and means for restarting the search of the page table for the page table entry in response to receiving the TLBI signal specifying the virtual address.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
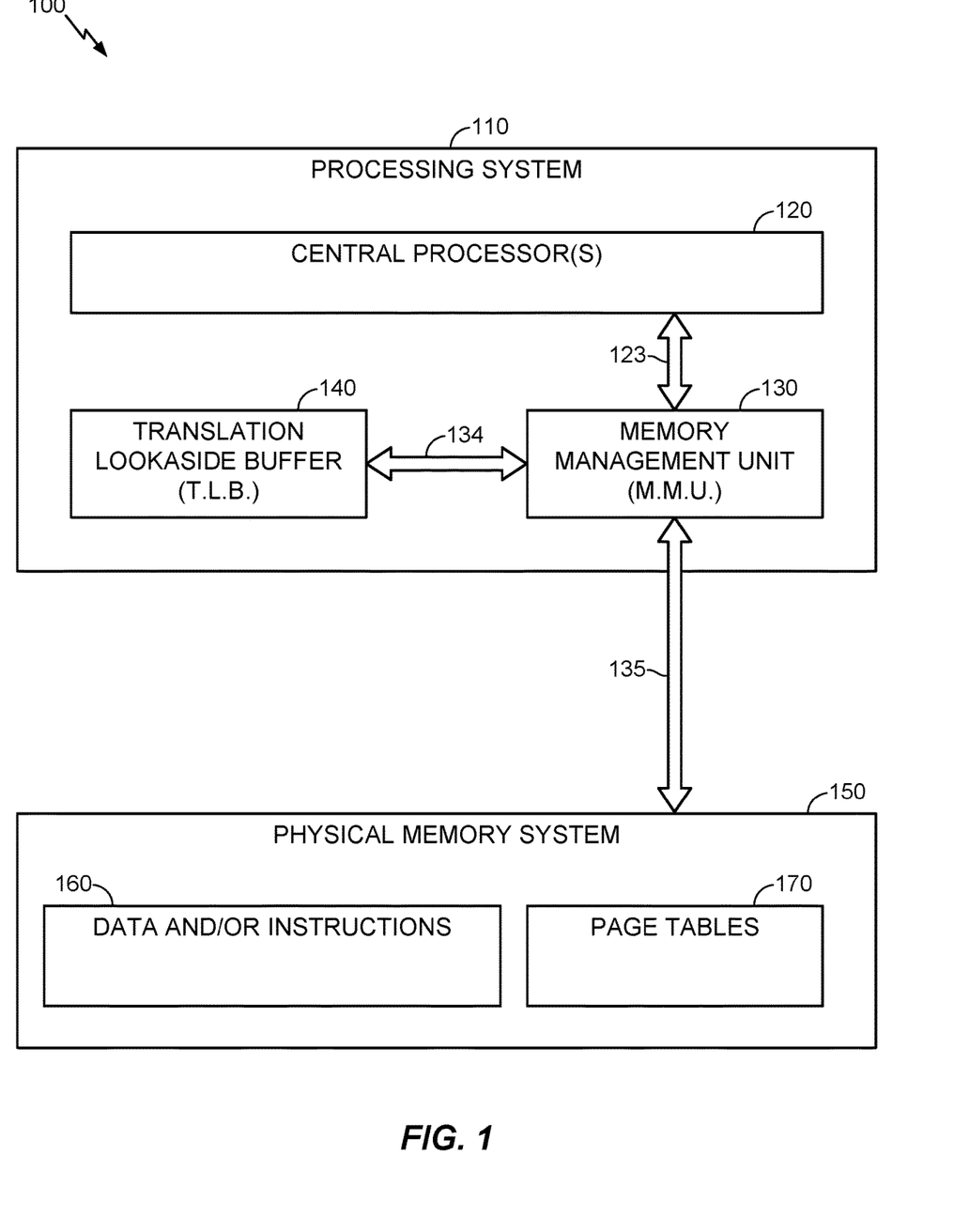
FIG. 1 generally illustrates a system for performing translation and mapping of virtual addresses to physical addresses in accordance with aspects of the disclosure.

FIG. 1 generally illustrates a system 100 for performing translation and mapping of virtual addresses to physical addresses in accordance with aspects of the disclosure.

The system 100 comprises a processing system 110 and a physical memory system 150. The processing system 110 may comprise one or more central processors (CPUs) 120, a memory management unit (MMU) 130, and a translation lookaside buffer (TLB) 140. A processor interconnect 123 may couple the CPUs 120 to the MMU 130. The MMU 130 may be coupled to the TLB 140 via a TLB path 134. The physical memory system 150 may comprise a physical memory 160 and page tables 170. The physical memory system 150 may be, for example random access memory (RAM). The MMU 130 may be coupled to the physical memory system 150 via a physical memory interconnect 135.

The page tables 170 map each virtual address used by the processing system 110 to a corresponding physical address associated with the physical memory system 150. The physical address may be located in the physical memory system 150, a hard drive (not shown), or some other storage component. When the processing system 110 needs data, the CPUs 120 may send the virtual address of the requested data to the MMU 130. The MMU 130 may perform the translation in tandem with the TLB 140 and/or physical memory system 150 and then return the corresponding physical address to the CPUs 120.

To perform the translation, the MMU 130 first checks the TLB 140 to determine if the virtual address of the requested data matches a virtual address associated with one of the TLB entries. If there is a match between the requested virtual address and a virtual address in a particular TLB entry, the processing system checks the TLB entry to determine whether the valid bit is set. If the entry is valid, then the TLB entry includes a valid translation of the virtual address. Accordingly, a corresponding physical address can be returned very quickly to the MMU, thereby completing the translation. Using the translated physical address, the processing system 110 can retrieve the requested data.

If the MMU 130 determines that the virtual address of the requested data does not match a virtual address associated with one of the TLB entries (or if a matching TLB entry is marked as invalid), then the MMU 130 walks through the page tables 170 in the physical memory system 150 until a matching virtual address is found.

Each translation may be performed in levels. For example, the MMU 130 may walk through a first page table of the page tables 170 in search of a match. A matching entry found in the first page table may include the first several bits of a physical address and an indication that additional bits may be found in a second page table of the page tables 170. The MMU 130 may then store the first several bits and walk through the second page table in search of a match. As noted above, the matching entry may include the next several bits of the physical address, and the process repeats if the matching entry includes an indication that additional bits may be found in a third page table of the page tables 170. The process may repeat until the matching entry indicates that a last level of translation has been reached. The last level may be, for example, the level that was most-recently reached. Once the last level of translation has been completed, the MMU 130 should have a complete translation of the full physical address.

If there is a match between the requested virtual address and a virtual address in a particular page table entry, the processing system 110 retrieves a physical address from the page table entry. Once found, the physical address is returned to the MMU 130. However, using the page tables 170 to perform the translation may be much slower than using the TLB 140. The TLB 140 is smaller than the physical memory system 150 and less remote than the physical memory system 150. Accordingly, the TLB 140 may be searched more quickly. The TLB 140 typically replicates a subset of the translations located in the page tables 170. The replicated translations are generally associated with virtual addresses that are most important, most frequently-used, and/or most recently-used.

It is often necessary to update the address maps in the TLB 140 and the page tables 170. The physical memory system 150 may have a limited capacity. When new data is requested after the capacity of the physical memory system 150 has been reached, then some pages within the physical memory system 150 must be overwritten with the requested new data. Once the overwrite has commenced and/or been completed, the mapping of virtual addresses to physical addresses must be updated to reflect the fact that the overwritten data is no longer located at its previous physical address.

In order to invalidate replicas in the TLB 140, the CPUs 120 may send TLB invalidators (TLBI) to the MMU 130. If the virtual address specified in the TLBI matches a TLB entry in the TLB 140, then that TLB entry is marked invalid and will not be used for translations until it has been rewritten with a valid translation (and marked valid).

Figure 2:
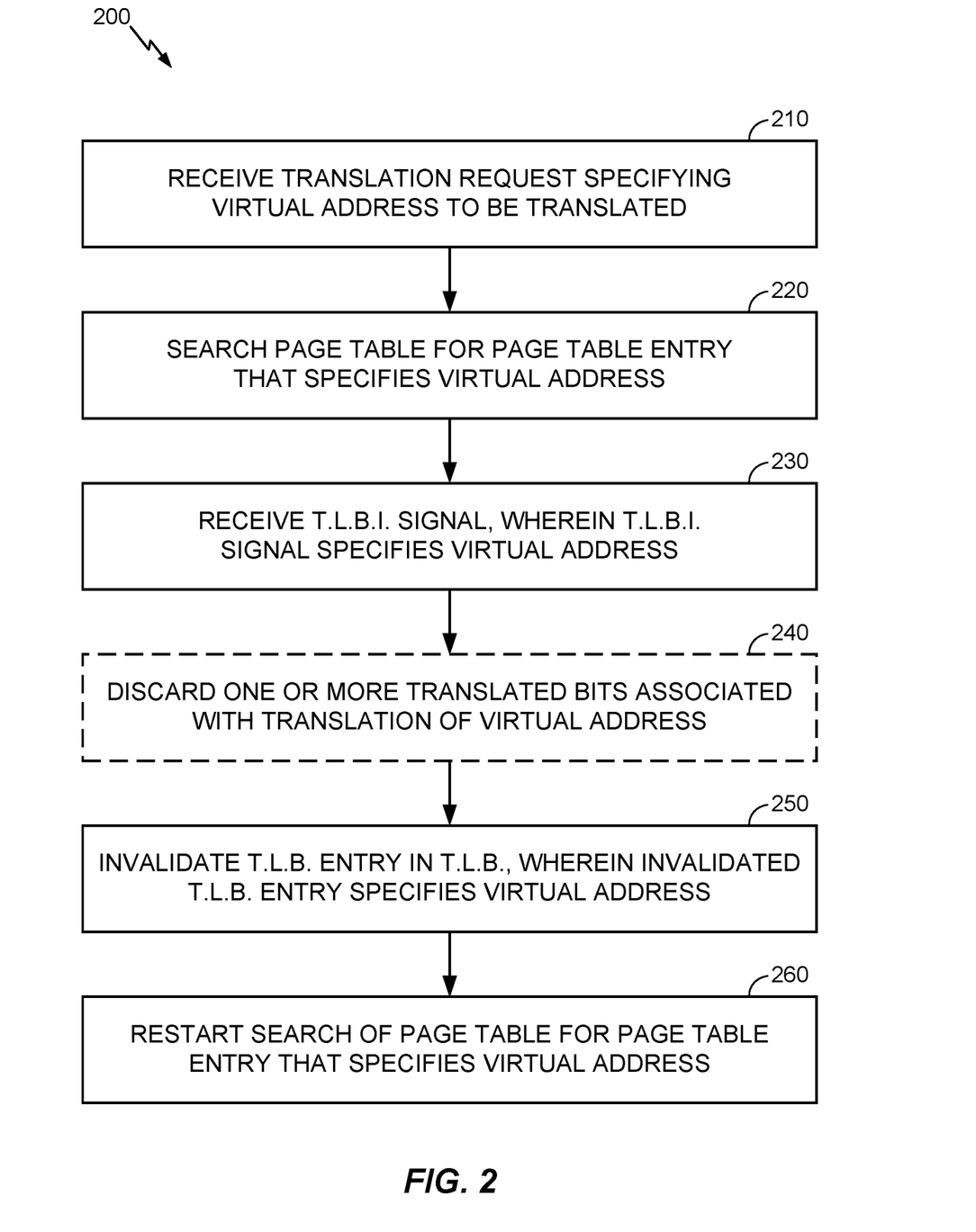
FIG. 2 generally illustrates a method for restarting a search of a page table for an entry that includes a virtual address associated with a TLBI.

FIG. 2 generally illustrates a method 200 for restarting a search of a page table for an entry that includes a virtual address associated with a TLBI. The method 200 will be described below as it would be performed by the MMU 130 depicted in FIG. 1. However, it will be understood that the method 200 may be performed by any suitable device.

At 210, the MMU 130 receives a translation request specifying a virtual address to be translated. Accordingly, the MMU 130 may constitute means for receiving a translation request specifying a virtual address to be translated. That translation request may be received from, for example, the CPUs 120.

At 220, the MMU 130 searches a page table (for example, one or more of the page tables 170) for a page table entry that includes the specified virtual address (received at 210). The searching at 220 may be performed in tandem with the physical memory system 150. Accordingly, the MMU 130 and/or the physical memory system 150 may constitute means for searching one or more page tables for a page table entry that includes the virtual address specified in the translation request.

At 230, the MMU 130 receives a TLBI signal indicating that the virtual address specified at 210 is to be invalidated. Accordingly, the MMU 130 may constitute means for receiving a TLBI signal specifying that the specified virtual address is to be invalidated.

At 240, the MMU 130 optionally discards one or more translated bits associated with the translation of the virtual address. Accordingly, the MMU 130 may constitute means for discarding one or more translated bits associated with the translation of the virtual address. In some scenarios, there may not be any translated bits, in which case the discarding at 240 may be omitted.

At 250, the MMU 130 invalidates a TLB entry in a TLB (for example, the TLB 140), wherein the invalidated TLB entry specifies the virtual address (i.e., the same virtual address that was specified at 210 and 230). Accordingly, the MMU 130 may constitute means for invalidating a TLB entry in a TLB, wherein the invalidated TLB entry specifies the virtual address.

At 260, the MMU 130 restarts a search of the page table for the specified virtual address. The restarting at 260 may be performed in tandem with the physical memory system 150. Accordingly, the MMU 130 and/or the physical memory system 150 may constitute means for restarting a search of the page table.

As will be discussed in greater detail below, the MMU 130 may in some scenarios perform a full restart by discarding all translated bits and starting over at the first level of translation. In other scenarios, the MMU 130 may perform a refetch by discarding a portion of the translated bits (for example, only the bits associated with a most-recent level of translation) and replacing them. As used herein, restart may be a generic term that encompasses a full restart or a refetch.

The functionalities depicted in FIG. 2 may be implemented in various ways consistent with the teachings herein. In some designs, the functionality may be implemented as one or more electrical components. In some designs, the functionality may be implemented as a processing system including one or more processor components. In some designs, the functionality may be implemented using, for example, at least a portion of one or more integrated circuits (e.g., an ASIC). As discussed herein, an integrated circuit may include a processor, software, other related components, or any combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the functionalities depicted in FIG. 2, as well as other components and functions described herein, may be implemented using any suitable means. Such means also may be implemented, at least in part, using corresponding structure as taught herein. The components described above may also correspond to similarly designated "code for" functionality. Thus, in some aspects one or more of such means may be implemented using one or more of processor components, integrated circuits, or other suitable structure as taught herein.

Figure 3:
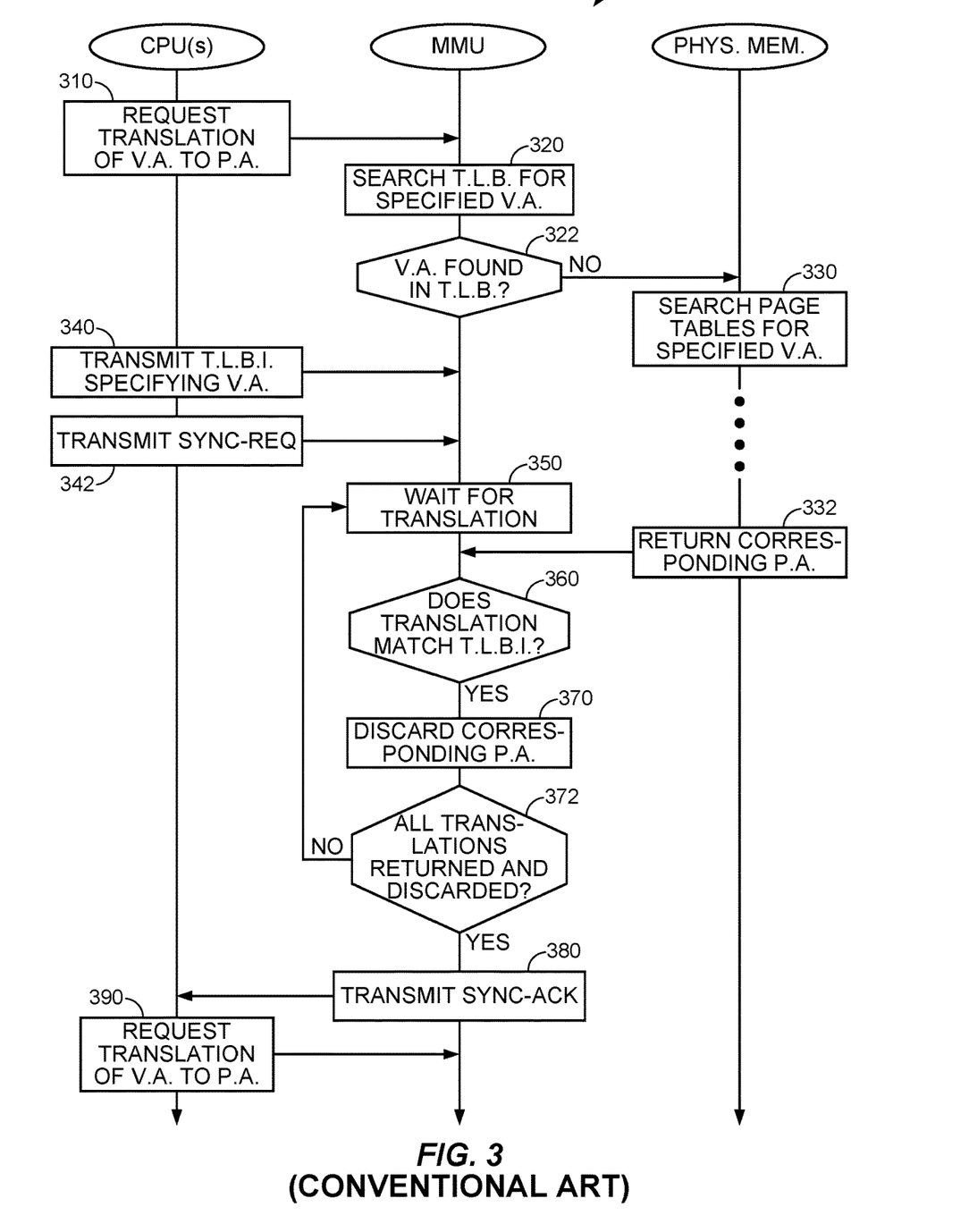
FIG. 3 generally illustrates a signal flow diagram showing signal exchanges in accordance with a conventional approach.

FIG. 3 generally illustrates a signal flow diagram 300 showing signal exchanges in accordance with a conventional approach. The signal flow diagram 300 shows signals exchanged among a conventional CPU, a conventional MMU and a conventional physical memory system.

At 310, the CPU sends a request to the MMU requesting a translation of a specified virtual address to a corresponding physical address.

At 320, the MMU searches a conventional TLB for the specified virtual address. At 322, the MMU determines whether the virtual address is in the TLB. In the present example, the virtual address is not in the TLB ('no' at 322).

As a result, the MMU triggers a search of the physical memory system (in particular, one or more page tables thereof).

At 330, the physical memory system searches the page tables for the specified virtual address. A search of a page table may sometimes be referred to as a "page walk". The page walk may take some time to complete and may continue until the physical memory system finds a page table entry that includes the specified virtual address. At 332, the physical memory system returns a corresponding physical address to the MMU.

However, before the returning at 332 is performed by the physical memory system (i.e., before or during the page walk), the one or more CPUs may invalidate one or more translations.

At 340, the CPU may transmit one or more TLBIs specifying the same virtual address as was specified in the requesting at 310. At 342, after the one or more TLBIs are transmitted, the CPU may transmit a synchronization request (SYNC-REQ) to the MMU.

At 350, after receiving the one or more TLBIs and the SYNC-REQ, the MMU waits for a translation of the specified virtual address. The MMU may wait for the duration of the page walk.

At 360, after receiving the corresponding physical address from the physical memory system, the MMU determines whether the translation matches one of the one or more TLBIs. In the present example, the virtual address being translated is the same as the virtual address being invalidated ('yes' at 360). Accordingly, the MMU determines that there is a match between the translation returned at 332 and one of the one or more TLBIs received at 340 and proceeds to 370.

At 370, in response to the determination that the corresponding physical address is associated with a virtual address specified in the TLBIs, the MMU discards the corresponding physical address. At 372, the MMU determines whether all translations (that is, all translations that match a virtual address specified in a TLBI and/or all translations that are pending in physical memory system at the time the TLBI is received) have been returned by the physical memory system and discarded by the MMU. If the MMU determines that the translations have not been returned and discarded ('no' at 372), then the MMU returns to 350 and waits for the next translation. If the MMU determines that all translations have been returned and discarded ('yes' at 372), then the MMU proceeds to 380.

At 380, the MMU transmits a synchronization acknowledgement (SYNC-ACK) to the CPUs. The SYNC-ACK may signal to the CPUs that the CPUs can safely proceed with any processes that have as a prerequisite condition the invalidation of the translations specified in the TLBIs.

At 390, the CPUs request a new translation of a virtual address to a physical address. The virtual address specified in the request transmitted at 390 may be the same as the virtual address specified in the request transmitted at 310. Assuming that no new TLBIs are issued, the TLB and/or the page tables may be used to perform the translation and return the corresponding physical address.

Figure 4:
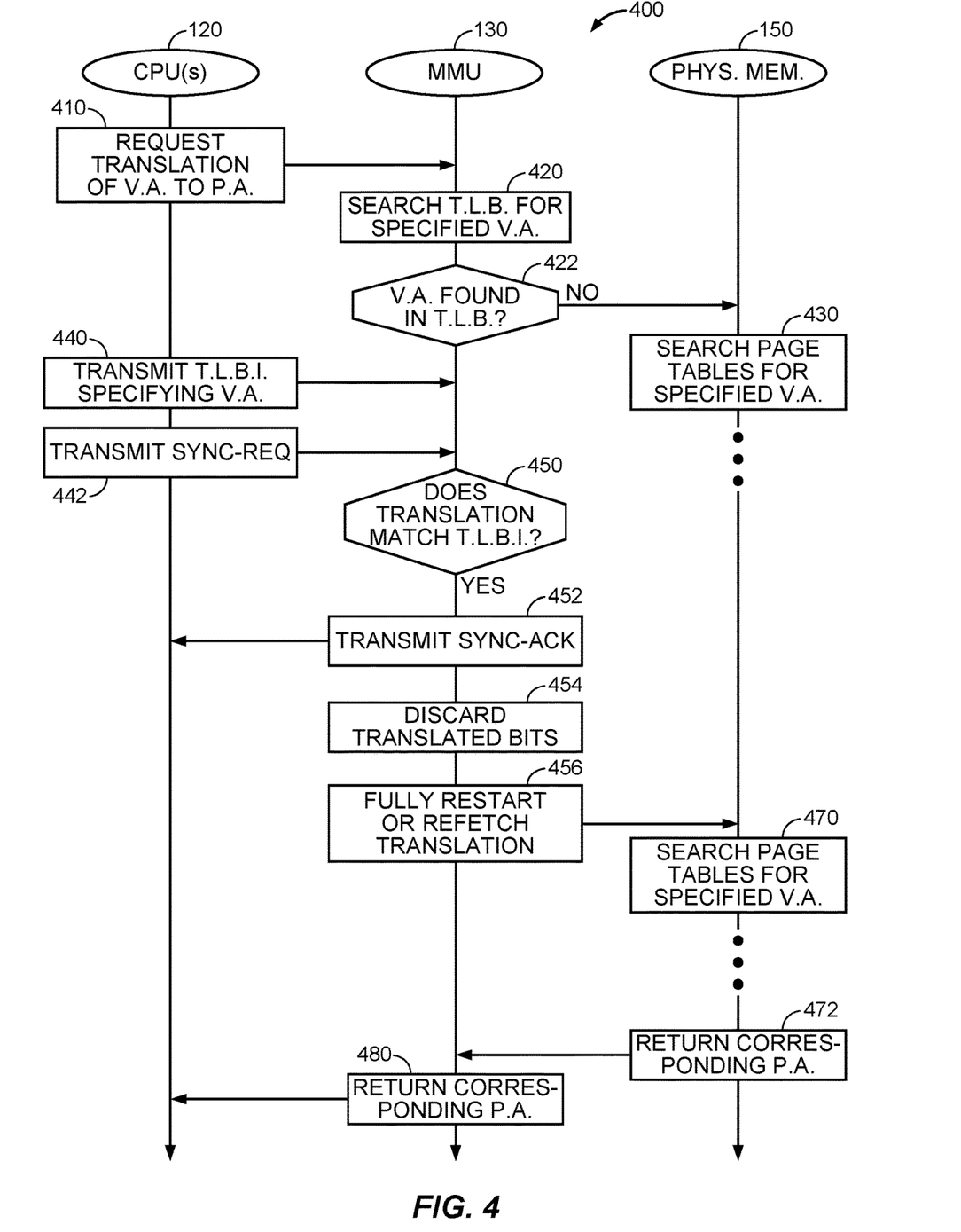
FIG. 4 generally illustrates a signal flow diagram showing signal exchanges performed by various components of the system of FIG. 1 in accordance with aspects of the disclosure.

FIG. 4 generally illustrates a signal flow diagram 400 showing signal exchanges performed in accordance with aspects of the disclosure by various components of the system 100 depicted in FIG. 1. In particular, the signal flow diagram 400 shows signals exchanged among the CPUs 120, the MMU 130, and the physical memory system 150.

At 410, one or more of the CPUs 120 sends a request to the MMU 130 requesting a translation of a specified virtual address to a corresponding physical address.

At 420, the MMU 130 searches the TLB 140 for the specified virtual address. In the present example, the virtual address is not in the TLB 140. At 422, the MMU 130 determines whether the virtual address is in the TLB 140. In the present example, the virtual address is not in the TLB 140 ('no' at 422). As a result, the MMU 130 triggers a search of the page tables 170 provided in the physical memory system 150.

At 430, the physical memory system 150 searches the page tables 170 for the specified virtual address. The page walk may take some time to complete and may continue until the physical memory system 150 finds a page table entry in the page tables 170 that includes the specified virtual address.

As in the signal scenario depicted in FIG. 3, the CPUs 120 may invalidate one or more translations before or during the page walk that has commenced at 430. At 440, the CPUs 120 may transmit one or more TLBIs specifying the same virtual address as was specified in the requesting at 410. At 442, after the one or more TLBIs are transmitted, the CPUs 120 may transmit a synchronization request (SYNC-REQ) to the MMU 130.

At 450, the MMU 130 determines whether a virtual address associated with a pending translation matches the virtual address specified in the TLBI. In the present example, the virtual address specified in the TLBI is currently being searched (at 430). In response to a determination that the virtual address specified in the TLBI is currently being searched ('yes' at 450), the MMU 130 proceeds to 452. In some implementations, the determining may be implemented in the manner described below in relation to FIGS. 5-7.

At 452, the MMU 130 transmits a SYNC-ACK to the CPUs 120. The SYNC-ACK transmitted at 452 may be similar in some respects to the SYNC-ACK transmitted in FIG. 3 (at 380). In particular, the SYNC-ACK may signal to the CPUs 120 that the CPUs 120 can safely proceed with any processes that have as a prerequisite condition the invalidation of the translations specified in the TLBIs. However, it will be understood that the signal flow diagram 400 depicted in FIG. 4 results in faster transmission and receipt of the SYNC-ACK. This is because the MMU 130 does not wait for translations (as at 350) before transmitting the SYNC-ACK.

At 454, the MMU 130 discards one or more translated bits associated with the invalidated virtual address. For example, if the physical memory system 150 has provided to the MMU 130 one or more bits specifying a translation (or partial translation) of an invalidated virtual address (not shown in FIG. 4), the MMU 130 discards the one or more bits. As will be discussed in greater detail below, a full restart may require that all translated bits associated with the invalidated virtual address are discarded, whereas a refetch may preserve one or more translated bits associated with unaffected levels of translation and discard only the one or more translated bits associated with the last level of translation.

At 456, the MMU 130 fully restarts or refetches a portion of the translation requested at 410. In particular, the MMU 130 triggers a search of the page tables 170 for the specified virtual address (the same virtual address identified in the request of 410). As will be discussed in greater detail below in relation to FIGS. 5-7, the decision between a full restart or a refetch may be based on a LEAF indicator provided in the TLBI. (To the best of the Applicant's knowledge, LEAF is traditionally capitalized, but not an acronym.)

At 470, the physical memory system 150 searches the page tables 170 for the specified virtual address. At 472, the physical memory system 150 returns the physical address that corresponds to the specified virtual address to the MMU 130. At 480, the MMU 130 provides the physical address to the CPUs 120.

It will be understood that, by contrast to the MMU depicted in FIG. 3, the MMU 130 will automatically restart the translation requested at 410 regardless of whether the translation has been completed. If a TLBI is received before the corresponding physical address (or a portion thereof) has been provided back to the CPUs 120, the MMU 130 discards one or more translated bits and immediately goes about replacing them with a new (valid) translation.

Figure 5:
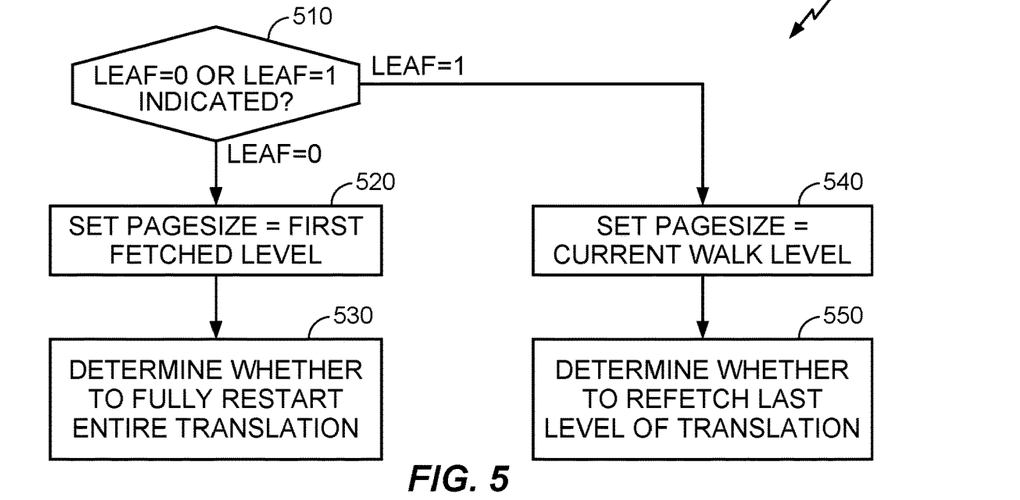
FIG. 5 generally illustrates a method for restarting and/or refetching translations based on a LEAF indicator in accordance with aspects of the disclosure.

FIG. 5 generally illustrates a method 500 for restarting and/or refetching translations based on a LEAF indicator in accordance with aspects of the disclosure. The method 500 may be an example implementation of the determining at 456 depicted in FIG. 4.

A TLBI may include a plurality of fields, including a virtual address field, an Application Space ID (ASID) field, a Virtual Machine ID (VMID) field, a translation regime indicator field, a LEAF indicator field, a stage indicator field, other suitable fields, or any combination thereof. The LEAF indicator may be, for example, a one-bit field in which a one (LEAF-1) indicates that the last level of translation has been invalidated, and a zero (LEAF-0) indicates that some other level of translation has been invalidated. The method 500 will be described below as it would be performed by the MMU 130. However, it will be understood that the method 500 may be performed by any suitable device in accordance with aspects of the disclosure.

At 510, the MMU 130 determines whether LEAF-0 or LEAF-1 is indicated in the LEAF indicator field of a received TLBI. If LEAF-0 is indicated ('LEAF-0' at 510), then the method 500 may proceed to 520. If LEAF-1 is indicated ('LEAF-1' at 510), then the method 500 may proceed to 540.

At 520, the MMU 130 sets a page size parameter equal to a page size value associated with the first fetched level. The page size parameter may indicate a size and/or arrangement of a mask used to perform any or all of the virtual address match determinations described in the present disclosure. Accordingly, a determination as to whether a specified virtual address has a match may depend on the page size. Depending on the page size parameter, one or more bits of the virtual address may be masked (i.e., not used to determine matching).

At 530, the MMU 130 determines whether to fully restart an entire translation, as will be discussed in greater detail below in relation to FIG. 6.

At 540, the MMU 130 sets a page size parameter equal to a page size value associated with the current walk level. As noted above, the page size parameter may indicate the size and/or arrangement of the mask used to perform the match determinations of the present disclosure.

At 550, the MMU 130 determines whether to refetch a last level of the translation, as will be discussed in greater detail below in relation to FIG. 6.

It will be understood that the method 500 or elements thereof may be example implementations of the determining at 450 and/or the discarding at 454 as depicted in FIG. 4. Moreover, the method 500 may constitute a prerequisite for the full restarting or refetching at 456, in which the MMU 130 determines whether to restart a translation, and whether the restart is a full restart or a refetch.

Figure 6:
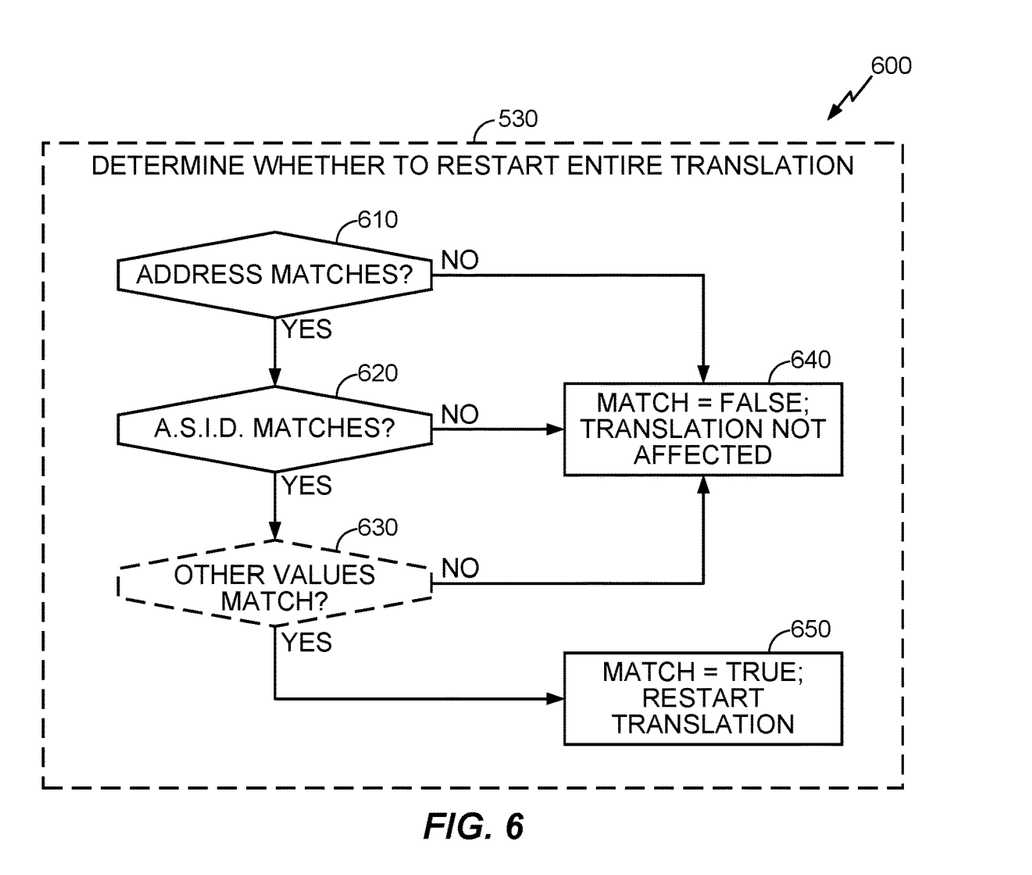
FIG. 6 generally illustrates a method that is an example implementation of the determining whether to fully restart depicted in FIG. 5.

FIG. 6 generally illustrates a method that is an example implementation of the determining whether to fully restart 530 depicted in FIG. 5. Accordingly, the method 600 may be performed in response to a determination that LEAF-0 is indicated (as at 510 in FIG. 5). The method 600 will be described below as it would be performed by the MMU 130. However, it will be understood that the method 600 may be performed by any suitable device in accordance with aspects of the disclosure.

At 610, the MMU 130 determines whether the virtual address specified in a received TLBI matches a virtual address used in one of a set of pending translations. If the MMU 130 determines that the virtual address does not match ('no' at 610), then the method 600 proceeds to 640. If the MMU 130 determines that the virtual address does match ('yes' at 610), then the method 600 proceeds to 620.

At 620, the MMU 130 determines whether the ASID specified in the received TLBI matches an ASID used in the set of pending translations. If the MMU 130 determines that the ASID does not match ('no' at 620), then the method 600 proceeds to 640. If the MMU 130 determines that the ASID does match ('yes' at 620), the method 600 proceeds to 630.

For translations with non-global attributes, a translation only matches the received TLBI if the ASID specified in the TLBI matches the ASID of a pending translation. For translations with global attributes, it may not be necessary to match the ASID. However, it may not be known whether the translation has global or non-global attributes until after the translation has been nearly completed (for example, upon receipt of a translation table descriptor (TTD)).

In accordance with aspects of the disclosure, attribute type may be determined based on a leaf indicator. As will be understood from FIGS. 5-6, the determining at 620 is preceded by a determination that the leaf indicator specified in the TLBI is LEAF-0. In accordance with aspects of the disclosure, it may be presumed that the attributes are non-global based on the determination that the leaf indicator specified in the TLBI is LEAF-0. Accordingly, because the attributes are presumed to be non-global, ASID may be matched at 620 before proceeding to optional 630 and/or 650. Moreover, the ASID matching may be performed prior to the receipt of a TTD, thereby increasing the speed of the translation.

At 630, the MMU 130 optionally determines whether one or more other values specified in the TLBI match a corresponding one or more other values used in the set of pending translations. If the MMU 130 determines that the one or more other values do not match ('no' at 630), then the method 600 proceeds to 640. If the MMU 130 determines that the one or more other values do match ('yes' at 630), the method 600 proceeds to 650. The one or more values may include, for example, a VMID, a translation regime, a stage of translation, other suitable fields, or any combination thereof.

It will be understood that if a match is not found at any one of the determinations 610, 620, and/or 630, then the method 600 will proceed to 640. Moreover, if a match is found at each and every determination (610, 620, and 630 (if included)), then the method 600 will proceed to 650.

At 640, the MMU 130 determines that the pending translations are not affected by the received TLBI. This is because one or more of the virtual address, ASID, and/or other values specified in the TLBI do not match the corresponding values in any of the set of pending translations.

At 650, the MMU 130 determines that a pending translation is affected by the received TLBI and fully restarts the entire translation. The determination that a pending translation is affected is based on a determination that all of the virtual address, ASID, and/or optional other values specified in the TLBI match the corresponding values associated with one or more pending translations.

Returning briefly to FIG. 4, it will be understood that the MMU 130 may, at 456, determine to fully restart the translation. It will be further understood that the full restarting at 456 may be implemented using the method 500 and/or method 600 depicted in FIGS. 5-6.

Figure 7:
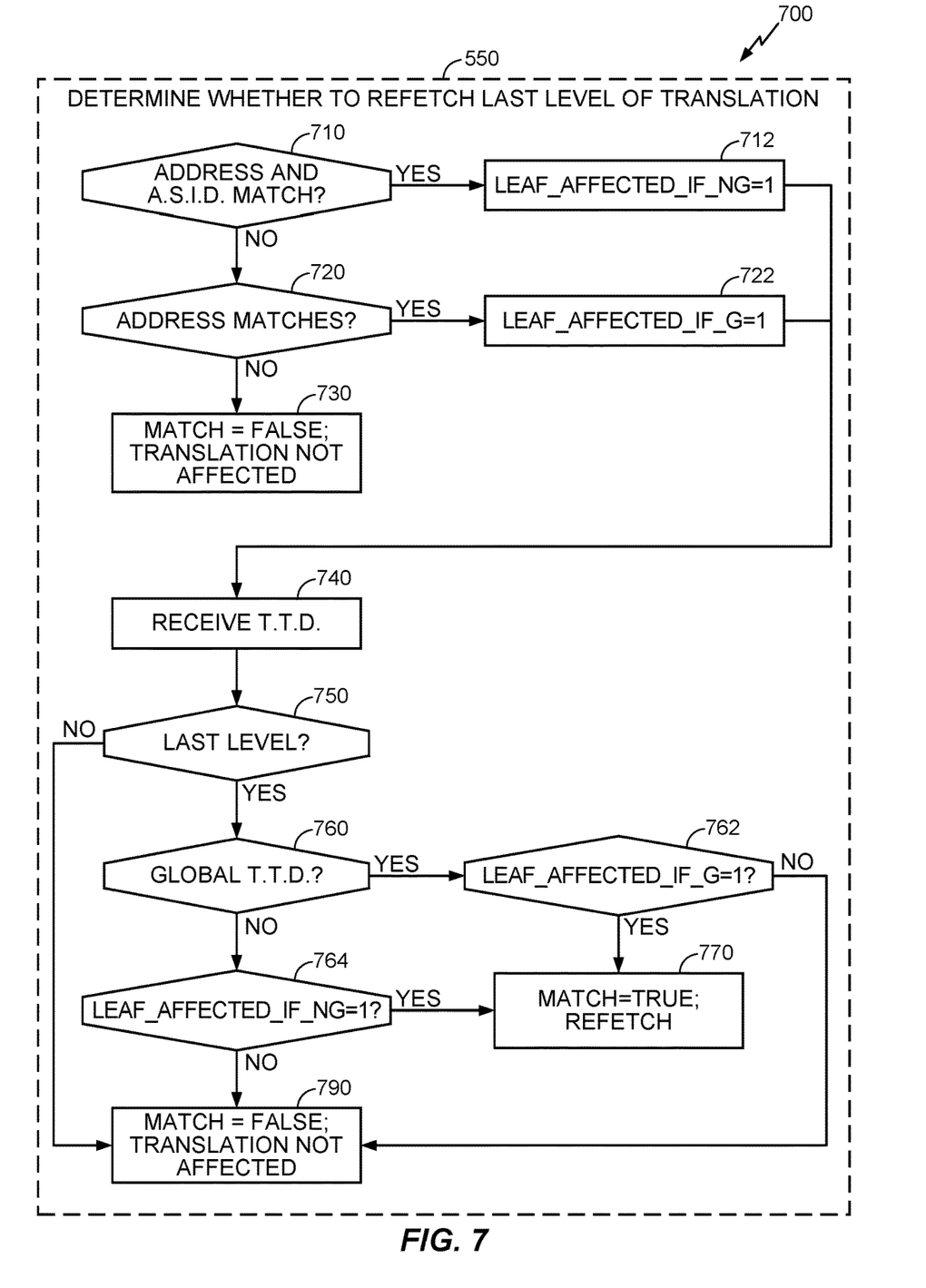
FIG. 7 generally illustrates a method that is an example implementation of the determining whether to refetch depicted in FIG. 5.

FIG. 7 generally illustrates a method 700 that is an example implementation of the determining whether to refetch 550 depicted in FIG. 5. Accordingly, the method 700 may be performed in response to a determination that LEAF-1 is indicated (as at 510 in FIG. 5). The method 700 will be described below as it would be performed by the MMU 130. However, it will be understood that the method 700 may be performed by any suitable device in accordance with aspects of the disclosure.

At 710, the MMU 130 determines whether the virtual address and ASID specified in a received TLBI both match a virtual address and ASID respectively associated with a pending translation in a set of pending translations. If the MMU 130 determines that the specified virtual address and ASID both match with a pending translation ('yes' at 710), the method 700 proceeds to 712. If the MMU 130 determines that either the specified virtual address or the ASID do not match any pending translation ('no' at 710), the method 700 proceeds to 720.

At 712, the MMU 130 determines that the translation is affected if the translation has non-global attributes. This determination may be tracked using a leaf-affected-if-non-global flag (which may be set to one for true and zero for false, for example).

As noted above, for translations with non-global attributes, a translation only matches the received TLBI if the ASID specified in the TLBI matches the ASID of a pending translation. However, it may be necessary to wait until a TTD arrives to determine the translation's attributes. As will be discussed in greater detail below, if when the TTD is received, it is determined that the translation is non-global, then a further determination may be made (based on the determination that the translation is non-global) that the translation is affected by the TLBI.

At 720, the MMU 130 determines whether the virtual address specified in the received TLBI matches a virtual address associated with a pending translation in a set of pending translations. If the MMU 130 determines that the specified virtual address is a match with a pending translation ('yes' at 720), the method 700 proceeds to 722. If the MMU 130 determines that the specified virtual address and ASID do not match any pending translation ('no' at 720), the method 700 proceeds to 730.

At 722, the MMU 130 determines that the translation is affected by the received TLBI if the translation has global attributes. This determination may be tracked using a leaf-affected-if-global flag (which may be set to one for true and zero for false, for example). As noted above, for translations with global attributes, a translation may match the received TLBI if the virtual address specified in the TLBI matches the virtual address of a pending translation, regardless of whether the ASID matches. However, as noted above, it may be necessary to wait until a TTD arrives to determine the translation's attributes. As will be discussed in greater detail below, if when the TTD is received, it is determined that the translation is global, then a further determination may be made (based on the determination that the translation is global) that the translation is affected by the TLBI.

At 730, the MMU 130 determines that the translation is not affected. It will be understood that the determination at 730 may be based on a determination (at 710 and 720) that the specified virtual address does not match a pending translation. Because the pending translation is not affected by the TLBI, there is no need to restart the pending translation. Moreover, there is no need to determine whether the translation has global or non-global attributes, and therefore no reason to wait until a TTD is received.

At 740, the MMU 130 receives a TTD. As noted above, the TTD may be received upon completion of the translation, and may specify whether the translation has global or non-global attributes.

At 750, the MMU 130 determines whether the last level of translation has been reached. The determination may be based on one or more fields in the TTD received at 740. If the MMU 130 determines that the last level of translation has been reached ('yes' at 750), then the method 700 may proceed to 760. If the MMU 130 determines that the last level of translation has not been reached ('no' at 750), then the method 700 may proceed to 790.

At 760, the MMU 130 determines whether the translation has global attributes. The determination may be based on one or more fields in the TTD received at 740. If the MMU 130 determines that the translation has global attributes ('yes' at 760), then the method 700 may proceed to 762. If the MMU 130 determines that the translation has non-global attributes ('no' at 760), then the method 700 may proceed to 764.

At 762, the MMU 130 determines whether the leaf-affected-if-non-global flag was set at 712. If the leaf-affected-if-non-global flag was set at 712 ('yes' at 762), then the method 700 proceeds to 770. If the leaf-affected-if-non-global flag was not set at 712 ('no' at 762), then the method 700 proceeds to 790.

At 764, the MMU 130 determines whether the leaf-affected-if-global flag was set at 722. If the leaf-affected-if-global flag was set at 722 ('yes' at 762), then the method 700 proceeds to 770. If the leaf-affected-if-global flag was set at 722 ('no' at 762), then the method 700 proceeds to 790.

At 770, the MMU 130 determines that the TLBI matches a pending translation and determines to maintain the translated bits that are not associated with the last level of translation, discard any translated bits associated with the last level of translation, and refetch the last level of translation.

At 790, the MMU 130 determines that the TLBI does not match a pending translation. Accordingly, the pending translations may be determined to be unaffected by the TLBI.

Figure 8:
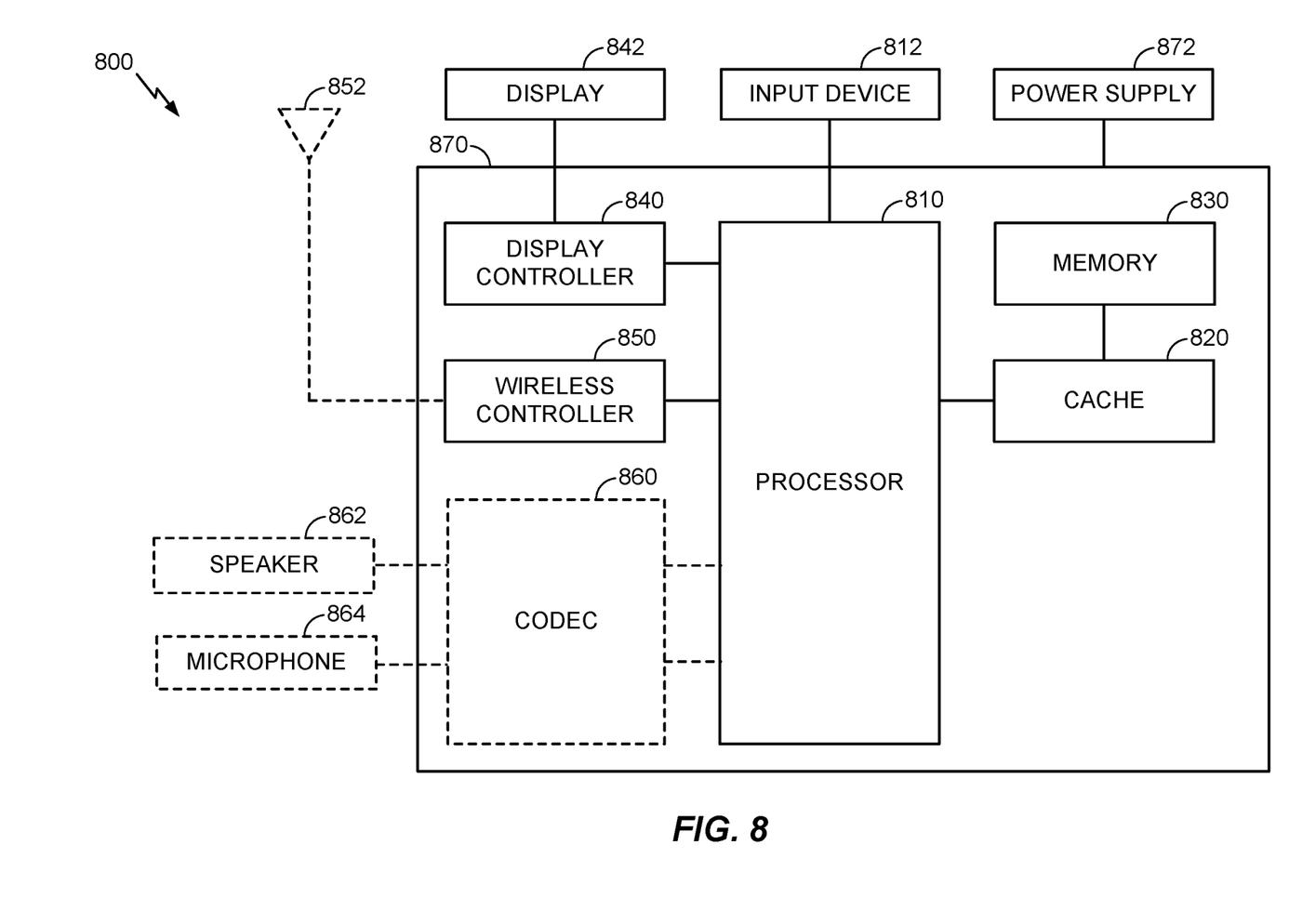
FIG. 8 generally illustrates an exemplary electronic device in which an aspect of the disclosure may be advantageously employed.

FIG. 8 generally illustrates an exemplary electronic device 800 in which an aspect of the disclosure may be advantageously employed.

Electronic device 800 may incorporate the system 100 depicted in FIG. 1, a system configured to perform the signaling depicted in FIG. 4, a system configured to perform the method 500 depicted in FIG. 5, a system configured to perform the method 600 depicted in FIG. 6, and/or a system configured to perform the method 700 depicted in FIG. 7. In the depiction of FIG. 8, electronic device 800 is shown to include a processor 810. Electronic device 800 may further comprise a cache 820. In FIG. 8, processor 810 is exemplarily shown to be coupled to memory 830 with cache 820 between processor 810 and memory 830, but it will be understood that other memory configurations known in the art may also be supported by electronic device 800.

FIG. 8 also depicts a display controller 840 that is coupled to processor 810 and to display 842. In some cases, electronic device 800 may be used for wireless communication. FIG. 8 depicts optional blocks in dashed lines, such as coder/decoder (CODEC) 860 (e.g., an audio and/or voice CODEC) coupled to processor 810. A speaker 862 and a microphone 864 may also be coupled to CODEC 860. Moreover, a wireless antenna 852 may be coupled to a wireless controller 850 which is coupled to processor 810. Where one or more of these optional blocks are present, in a particular aspect, processor 810, display controller 840, memory 830, and wireless controller 850 are included in a system-in-package or system-on-chip device 870.

Accordingly, a particular aspect, an input device 812 and a power supply 872 are coupled to the system-on-chip device 870. Moreover, in a particular aspect, as illustrated in FIG. 8, where one or more optional blocks are present, display 842, input device 812, speaker 862, microphone 864, wireless antenna 852, and power supply 872 are external to the system-on-chip device 870. However, each of display 842, input device 812, speaker 862, microphone 864, wireless antenna 852, and power supply 872 can be coupled to a component of the system-on-chip device 870, such as an interface or a controller. In some implementations, one or more of the components of the electronic device 800 may communicate with one another via a system bus.

It should be noted that although FIG. 8 generally depicts a generic electronic device 800, one or more of the components of the electronic device 800 may additionally or alternatively be integrated into a set top box, a music player, a video player, an entertainment unit, a navigation device, a personal digital assistant (PDA), a fixed location data unit, a computer, a laptop, a tablet, a communications device, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include computer-readable media embodying a method for bus control. Accordingly, the invention is not limited to illustrated examples and any means for performing the functionality described herein are included in aspects of the invention.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of non-transitory storage medium known in the art. As used herein the term "non-transitory" does not exclude any physical storage medium or memory and particularly does not exclude dynamic memory (e.g., RAM) but rather excludes only the interpretation that the medium can be construed as a transitory propagating signal. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the apparatus claims in accordance with the aspects of the disclosure described herein need not be performed in any particular order. Furthermore, although certain aspects may be described or claimed in the singular, the plural is contemplated unless limitation to the singular is explicitly stated.

It will be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not imply that there are only two elements and further does not imply that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements".

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted in all cases as "based at least in part on" rather than, for example, "based solely on".

It will be understood that terms such as "top" and "bottom", "left" and "right", "vertical" and "horizontal", etc., are relative terms used strictly in relation to one another, and do not express or imply any relation with respect to gravity, a manufacturing device used to manufacture the components described herein, or to some other device to which the components described herein are coupled, mounted, etc. The term "exchange" may refer to one or more data transfers from one component to another. For example, with respect to a particular component, exchanging functionality may be constituted by sending functionality, receiving functionality, or any combination thereof.

What is claimed is:

1. A memory management unit (MMU) configured to:
    receive a translation request from a processing system, wherein the translation request specifies a virtual address to be translated;
    search a page table stored in a physical memory system for a page table entry that specifies the virtual address;
    receive a translation lookaside buffer invalidation (TLBI) signal from the processing system, wherein the TLBI signal specifies the virtual address;
    in response to receiving the TLBI signal specifying the virtual address:
        invalidate a translation lookaside buffer (TLB) entry in a TLB, wherein the invalidated TLB entry specifies the virtual address; and
        restart the search of the page table for the page table entry that specifies the virtual address and wherein the MMU is further configured to discard one or more translated bits associated with the translation of the virtual address, and to discard, the MMU is further configured to:
select the one or more translated bits based on a LEAF indication; and
discard the selected one or more translated bits.

2. The MMU of claim 1, wherein the search of the page table includes:
a search of at least one primary page table that results in a translation of at least one primary fraction of a physical address; and
a search of a secondary page table that has commenced but has not completed a translation of at least one secondary fraction of the physical address.

3. The MMU of claim 2, wherein:
the TLBI signal specifies a LEAF-1 invalidation;
to discard, the MMU is further configured to discard any translated bits associated with the at least one secondary fraction of the physical address; and
to restart the search of the page table, the MMU is further configured to complete the translation of the at least one secondary fraction of the physical address by refetching one or more bits from the secondary page table.

4. The MMU of claim 3, wherein to restart the search of the page table, the MMU is further configured to:
maintain the at least one primary fraction of the physical address; and
provide to the processing system a full translation of the virtual address that includes the at least one primary fraction of the physical address and the at least one secondary fraction of the physical address.

5. The MMU of claim 2, wherein:
the TLBI signal specifies a LEAF-0 invalidation;
to discard, the MMU is further configured to discard of any translated bits associated with the search of the at least one primary page table and a discard of any translated bit associated with the search of the secondary page table; and
to restart the search of the page table, the MMU is further configured to fully restart the search of the at least one primary page table and the search of the secondary page table.

6. The MMU of claim 1, wherein:
the TLBI signal further specifies that it is a LEAF-0 invalidation or a LEAF-1 invalidation; and
the MMU is further configured to:
fully restart an entire translation in response to a determination that the TLBI signal is a LEAF-0 invalidation and a determination that one or more of the virtual address and an Application Space ID (ASID) specified in the TLBI signal matches the translation; and
refetch a last level of a translation in response to a determination that the TLBI signal is a LEAF-1 invalidation and a determination that one or more of the virtual address and the ASID specified in the TLBI signal matches the translation.

7. The MMU of claim 6, wherein the MMU is further configured to:
determine whether the virtual address and the ASID match the TLBI signal;
set a leaf-affected-if-non-global flag in response to a determination that both the virtual address and the ASID match the TLBI signal;
receive a translation table descriptor (TTD);
determine, based on the TTD, whether the translation has global attributes; and
refetch the last level of the translation in response to a determination that the leaf-affected-if-non-global flag is set and a determination that the translation does not have global attributes.

8. The MMU of claim 6, wherein the MMU is further configured to:
determine whether the virtual address matches the TLBI signal;
set a leaf-affected-if-global flag in response to a determination that the virtual address matches the TLBI signal;
receive a translation table descriptor (TTD);
determine, based on the TTD, whether the translation has global attributes; and
refetch the last level of the translation in response to a determination that the leaf-affected-if-global flag is set and a determination that the translation has global attributes.

9. A method, comprising:
receiving, at a memory management unit (MMU), a translation request from a processing system, wherein the translation request specifies a virtual address to be translated;
searching a page table stored in a physical memory system for a page table entry that specifies the virtual address;
receiving a translation lookaside buffer invalidation (TLBI) signal from the processing system, wherein the TLBI signal specifies the virtual address;
in response to receiving the TLBI signal specifying the virtual address:
invalidating a translation lookaside buffer (TLB) entry in a TLB, wherein the invalidated TLB entry specifies the virtual address; and
restarting the search of the page table for the page table entry that specifies the virtual address and
further comprising, in response to receiving the TLBI signal specifying the virtual address, discarding one or more translated bits associated with the translation of the virtual address, wherein the discarding comprises:
selecting the one or more translated bits based on a LEAF indication; and
discarding the selected one or more translated bits.

10. The method of claim 9, wherein the searching of the page table includes:
searching at least one primary page table that results in a translation of at least one primary fraction of a physical address; and
searching a secondary page table that has commenced but has not completed a translation of at least one secondary fraction of the physical address.

11. The method of claim 10, wherein:
the TLBI signal specifies a LEAF-1 invalidation;
the discarding comprises discarding any translated bits associated with the at least one secondary fraction of the physical address; and
the restarting comprises completing the translation of the at least one secondary fraction of the physical address by refetching one or more bits from the secondary page table.

12. The method of claim 11, wherein the restarting further comprises:
maintaining the at least one primary fraction of the physical address; and
providing to the processing system a full translation of the virtual address that includes the at least one primary fraction of the physical address and the at least one secondary fraction of the physical address.

13. The method of claim 10, wherein:
the TLBI signal specifies a LEAF-0 invalidation;
the discarding comprises discarding any translated bits associated with the search of the at least one primary page table and discarding any translated bit associated with the search of the secondary page table; and
the restarting comprises fully restarting the search of the at least one primary page table and the search of the secondary page table.

14. The method of claim 9, wherein:
the TLBI signal further specifies that it is a LEAF-0 invalidation or a LEAF-1 invalidation; and
the method further comprises:
fully restarting an entire translation in response to a determination that the TLBI signal is a LEAF-0 invalidation and a determination that one or more of the virtual address and an Application Space ID (ASID) specified in the TLBI signal matches the translation; and
refetching a last level of a translation in response to a determination that the TLBI signal is a LEAF-1 invalidation and a determination that one or more of the virtual address and the ASID specified in the TLBI signal matches the translation.

15. The method of claim 14, further comprising:
determining whether the virtual address and the ASID match the TLBI signal;
setting a leaf-affected-if-non-global flag in response to a determination that both the virtual address and the ASID match the TLBI signal;
receiving a translation table descriptor (TTD);
determining, based on the TTD, whether the translation has global attributes; and
refetching the last level of the translation in response to a determination that the leaf-affected-if-non-global flag is set and a determination that the translation does not have global attributes.

16. The method of claim 14, further comprising:
determining whether the virtual address matches the TLBI signal;
setting a leaf-affected-if-global flag in response to a determination that the virtual address matches the TLBI signal;
receiving a translation table descriptor (TTD);
determining, based on the TTD, whether the translation has global attributes; and
refetching the last level of the translation in response to a determination that the leaf-affected-if-global flag is set and a determination that the translation has global attributes.

17. An apparatus, comprising:
means for receiving, at a memory management unit (MMU), a translation request from a processing system, wherein the translation request specifies a virtual address to be translated;
means for searching a page table stored in a physical memory system for a page table entry that specifies the virtual address;
means for receiving a translation lookaside buffer invalidation (TLBI) signal from the processing system, wherein the TLBI signal specifies the virtual address;
means for invalidating a translation lookaside buffer (TLB) entry in a TLB, wherein the invalidated TLB entry specifies the virtual address in response to receiving the TLBI signal specifying the virtual address;
means for restarting the search of the page table for the page table entry in response to receiving the TLBI signal specifying the virtual address; and
further comprising means for discarding one or more translated bits associated with the translation of the virtual address in response to receiving the TLBI signal specifying the virtual address, wherein the means for discarding comprises:
means for selecting the one or more translated bits based on a LEAF indication; and
means for discarding the selected one or more translated bits.

18. The apparatus of claim 17, wherein the means for searching the page table includes:
means for searching at least one primary page table that results in a translation of at least one primary fraction of a physical address; and
means for searching a secondary page table that has commenced but has not completed a translation of at least one secondary fraction of the physical address.

19. The apparatus of claim 18, wherein:
the TLBI signal specifies a LEAF-1 invalidation;
the means for discarding comprises means for discarding any translated bits associated with the at least one secondary fraction of the physical address; and
the means for restarting comprises means for completing the translation of the at least one secondary fraction of the physical address by refetching one or more bits from the secondary page table.

20. The apparatus of claim 19, wherein the means for restarting further comprises:
means for maintaining the at least one primary fraction of the physical address; and
means for providing to the processing system a full translation of the virtual address that includes the at least one primary fraction of the physical address and the at least one secondary fraction of the physical address.

21. The apparatus of claim 18, wherein:
the TLBI signal specifies a LEAF-0 invalidation;
the means for discarding comprises means for discarding any translated bits associated with the search of the at least one primary page table and means for discarding of any translated bit associated with the search of the secondary page table; and
the means for restarting comprises means for fully restarting the search of the at least one primary page table and the search of the secondary page table.

22. The apparatus of claim 17, wherein:
the TLBI signal further specifies that it is a LEAF-0 invalidation or a LEAF-1 invalidation; and
the apparatus further comprises:
means for fully restarting an entire translation in response to a determination that the TLBI signal is a LEAF-0 invalidation and a determination that one or more of the virtual address and an Application Space ID (ASID) specified in the TLBI signal matches the translation; and
means for refetching a last level of a translation in response to a determination that the TLBI signal is a LEAF-1 invalidation and a determination that one or more of the virtual address and the ASID specified in the TLBI signal matches the translation.

23. The apparatus of claim 22, further comprising:
means for determining whether the virtual address and the ASID match the TLBI signal;

means for setting a leaf-affected-if-non-global flag in response to a determination that both the virtual address and the ASID match the TLBI signal;

means for receiving a translation table descriptor (TTD);

means for determining, based on the TTD, whether the translation has global attributes; and means for refetching the last level of the translation in response to a determination that the leaf-affected-if-non-global flag is set and a determination that the translation does not have global attributes.

24. The apparatus of claim 22, further comprising:

means for determining whether the virtual address matches the TLBI signal;

means for setting a leaf-affected-if-global flag in response to a determination that the virtual address matches the TLBI signal;

means for receiving a translation table descriptor (TTD);

means for determining, based on the TTD, whether the translation has global attributes; and means for refetching the last level of the translation in response to a determination that the leaf-affected-if-global flag is set and a determination that the translation has global attributes.

* * * * *